United States Patent
Andreasen

(10) Patent No.: US 9,215,588 B2
(45) Date of Patent: Dec. 15, 2015

(54) SYSTEM AND METHOD FOR PROVIDING SELECTIVE BEARER SECURITY IN A NETWORK ENVIRONMENT

(75) Inventor: Flemming S. Andreasen, Marlboro, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 472 days.

(21) Appl. No.: 12/771,574

(22) Filed: Apr. 30, 2010

(65) Prior Publication Data

US 2011/0271320 A1 Nov. 3, 2011

(51) Int. Cl.
- *H04L 7/00* (2006.01)
- *H04W 12/06* (2009.01)
- *H04L 29/06* (2006.01)

(52) U.S. Cl.
CPC ........... *H04W 12/06* (2013.01); *H04L 63/0869* (2013.01); *H04L 63/164* (2013.01)

(58) Field of Classification Search
USPC ....................... 726/1, 5, 6; 370/310, 437, 465
See application file for complete search history.

(56) References Cited

U.S. PATENT DOCUMENTS

| | | | |
|---|---|---|---|
| 6,181,935 B1 | 1/2001 | Gossman et al. | |
| 6,403,567 B1 | 6/2002 | Zablocki et al. | |
| 6,587,882 B1 | 7/2003 | Inoue et al. | |
| 6,603,761 B1 | 8/2003 | Wang et al. | |
| 6,910,074 B1 | 6/2005 | Amin et al. | |
| 6,934,274 B2 | 8/2005 | Inoue et al. | |
| 6,937,597 B1 | 8/2005 | Rosenberg et al. | |
| 6,970,909 B2 | 11/2005 | Schulzrinne | |
| 7,020,090 B2 | 3/2006 | Chandwadkar et al. | |
| 7,079,499 B1 | 7/2006 | Akhtar et al. | |
| 7,170,863 B1 | 1/2007 | Denman et al. | |
| 7,170,887 B2 | 1/2007 | Rosenberg | |
| 7,548,756 B2 | 6/2009 | Chen et al. | |
| 7,606,191 B1 | 10/2009 | Breau et al. | |
| 7,710,923 B2 | 5/2010 | Carlton | |
| 7,831,701 B2 | 11/2010 | Hu | |
| 7,835,275 B1 | 11/2010 | Swan et al. | |
| 7,881,262 B2 | 2/2011 | Shousterman | |
| 7,886,027 B2 | 2/2011 | Bolan et al. | |

(Continued)

OTHER PUBLICATIONS

Sumit A. Vakil and Pat R. Calhoun, DIAMETER: IP Security Policy Extensions <draft-calhoun-diameteripsec-policy-00.txt> Internet Draft, Mar. 1998, 35 pages; http://tools.ietf.org/pdf/draft-calhoun-diameter-ipsec-policy-00.pdf.

USPTO Jan. 9, 2012 Response to Oct. 7, 2011 Non-Final Office Action from U.S. Appl. No. 12/642,797.

USPTO Mar. 14, 2012 Response to Non-Final Office Action mailed Dec. 14, 2011 from U.S. Appl. No. 12/371,524.

(Continued)

*Primary Examiner* — Joseph P Hirl
*Assistant Examiner* — Sayed Beheshti Shirazi
(74) *Attorney, Agent, or Firm* — Patent Capital Group

(57) ABSTRACT

An example method includes receiving a message related to a bearer or an Internet Protocol (IP) flow, the message includes an extension indicating whether an Internet Protocol security (IPsec) feature is designated for the bearer or the IP flow. The method further includes mapping a communication flow to the bearer or the IP flow, and applying the IPsec feature to the bearer or the IP flow. In other embodiments, the method can include communicating the extension to a next destination, and updating a security policy to indicate that the bearer or the IP flow is designated for the IPsec feature. In yet other embodiments, an Internet Key Exchange (IKE) is used to establish a security association for a serving gateway associated with the communication flow. The extension is provided at an IP flow level or at a bearer level such that network traffic is designated for the IPsec feature.

19 Claims, 5 Drawing Sheets

(56) References Cited

U.S. PATENT DOCUMENTS

| | | | |
|---|---|---|---|
| 7,899,039 B2 | 3/2011 | Andreasen et al. | |
| 8,032,940 B1* | 10/2011 | Dhanani | 726/26 |
| 8,036,191 B2 | 10/2011 | Kroselberg et al. | |
| 8,150,366 B2 | 4/2012 | Noguchi et al. | |
| 8,195,778 B1 | 6/2012 | Leung et al. | |
| 8,223,635 B2 | 7/2012 | Song | |
| 8,379,519 B2 | 2/2013 | You et al. | |
| 2003/0091013 A1 | 5/2003 | Song et al. | |
| 2003/0165145 A1 | 9/2003 | Cho | |
| 2004/0003241 A1 | 1/2004 | Sengodan et al. | |
| 2004/0008627 A1 | 1/2004 | Garg et al. | |
| 2004/0057458 A1 | 3/2004 | Kil et al. | |
| 2004/0077341 A1* | 4/2004 | Chandranmenon et al. | 455/418 |
| 2004/0213260 A1 | 10/2004 | Leung et al. | |
| 2004/0219905 A1 | 11/2004 | Blumenthal et al. | |
| 2004/0225895 A1* | 11/2004 | Mukherjee et al. | 713/201 |
| 2005/0135375 A1 | 6/2005 | Hurtta et al. | |
| 2005/0159181 A1 | 7/2005 | Gadgil et al. | |
| 2005/0238002 A1 | 10/2005 | Rasanen | |
| 2005/0278532 A1 | 12/2005 | Fu et al. | |
| 2006/0041761 A1* | 2/2006 | Neumann et al. | 713/189 |
| 2006/0063517 A1 | 3/2006 | Oh et al. | |
| 2006/0092963 A1* | 5/2006 | Bakre et al. | 370/437 |
| 2006/0104308 A1* | 5/2006 | Pinkerton et al. | 370/469 |
| 2006/0111112 A1 | 5/2006 | Maveddat | |
| 2006/0250956 A1 | 11/2006 | Alfano et al. | |
| 2006/0251043 A1 | 11/2006 | Madour et al. | |
| 2006/0251229 A1 | 11/2006 | Gorti et al. | |
| 2006/0268845 A1 | 11/2006 | He et al. | |
| 2006/0268901 A1 | 11/2006 | Choyi et al. | |
| 2007/0127500 A1 | 6/2007 | Maeng | |
| 2007/0133574 A1 | 6/2007 | Tejani et al. | |
| 2007/0140255 A1 | 6/2007 | Gautier et al. | |
| 2007/0160034 A1 | 7/2007 | Koretsky | |
| 2007/0189255 A1 | 8/2007 | Navali et al. | |
| 2007/0202871 A1 | 8/2007 | Altshuller et al. | |
| 2007/0207818 A1 | 9/2007 | Rosenberg et al. | |
| 2007/0266174 A1 | 11/2007 | Bestler | |
| 2007/0291733 A1 | 12/2007 | Doran et al. | |
| 2008/0026692 A1 | 1/2008 | Kojima | |
| 2008/0046963 A1 | 2/2008 | Grayson et al. | |
| 2008/0046979 A1 | 2/2008 | Oulahal | |
| 2008/0049648 A1 | 2/2008 | Liu et al. | |
| 2008/0070619 A1 | 3/2008 | Yu | |
| 2008/0075114 A1 | 3/2008 | Mo | |
| 2008/0089251 A1 | 4/2008 | Gallego et al. | |
| 2008/0101291 A1 | 5/2008 | Jiang et al. | |
| 2008/0127297 A1* | 5/2008 | Morris | 726/1 |
| 2008/0137541 A1 | 6/2008 | Agarwal et al. | |
| 2008/0144615 A1* | 6/2008 | Casey | 370/389 |
| 2008/0155677 A1* | 6/2008 | Hossain et al. | 726/15 |
| 2008/0176582 A1 | 7/2008 | Ghai et al. | |
| 2008/0207206 A1 | 8/2008 | Taniuchi et al. | |
| 2008/0225806 A1 | 9/2008 | Arian et al. | |
| 2008/0229403 A1 | 9/2008 | Oswal et al. | |
| 2008/0256237 A1 | 10/2008 | Liu | |
| 2008/0256251 A1 | 10/2008 | Huotari et al. | |
| 2008/0285492 A1 | 11/2008 | Vesterinen | |
| 2008/0307487 A1 | 12/2008 | Choyi et al. | |
| 2009/0016334 A1 | 1/2009 | Forsberg et al. | |
| 2009/0016364 A1 | 1/2009 | Krishnan | |
| 2009/0061869 A1 | 3/2009 | Bui et al. | |
| 2009/0067417 A1 | 3/2009 | Kalavade et al. | |
| 2009/0129380 A1* | 5/2009 | Paul et al. | 370/389 |
| 2009/0198996 A1 | 8/2009 | Lie et al. | |
| 2009/0207759 A1 | 8/2009 | Andreasen et al. | |
| 2009/0207808 A1* | 8/2009 | McCann et al. | 370/331 |
| 2009/0207823 A1 | 8/2009 | Andreasen et al. | |
| 2009/0207843 A1 | 8/2009 | Andreasen | |
| 2009/0219946 A1 | 9/2009 | Liu et al. | |
| 2009/0270064 A1 | 10/2009 | Kunniyur et al. | |
| 2010/0027509 A1 | 2/2010 | Velev et al. | |
| 2010/0061309 A1 | 3/2010 | Buddhikot et al. | |
| 2010/0071055 A1* | 3/2010 | Kaniz et al. | 726/14 |
| 2010/0131621 A1 | 5/2010 | Zetterlund et al. | |
| 2010/0135279 A1 | 6/2010 | Petersson et al. | |
| 2010/0191829 A1 | 7/2010 | Cagenius | |
| 2010/0235620 A1* | 9/2010 | Nylander et al. | 713/151 |
| 2010/0250753 A1 | 9/2010 | Song et al. | |
| 2010/0260105 A1 | 10/2010 | Keller et al. | |
| 2010/0272053 A1 | 10/2010 | You et al. | |
| 2010/0309846 A1 | 12/2010 | Rune | |
| 2011/0069673 A1* | 3/2011 | Oswal et al. | 370/331 |
| 2011/0103266 A1 | 5/2011 | Andreasen et al. | |
| 2011/0149876 A1* | 6/2011 | Venkatachalam | 370/329 |
| 2011/0214166 A1* | 9/2011 | Vinayakray-Jani | 726/5 |
| 2012/0046037 A1 | 2/2012 | Diachina et al. | |

OTHER PUBLICATIONS

USPTO Nov. 17, 2011 Final Office Action from U.S. Appl. No. 12/371,511.

USPTO Jul. 8, 2011 RCE Response to Apr. 8, 2011 Final Office Action from U.S. Appl. No. 12/371,516.

USPTO Jun. 9, 2011 Final Office Action from U.S. Appl. No. 12/371,524.

USPTO Sep. 9, 2011 RCE Response to Jun. 9, 2011 Final Office Action from U.S. Appl. No. 12/371,524.

USPTO Jul. 21, 2011 Non-Final Office Action from U.S. Appl. No. 12/371,511.

USPTO Apr. 16, 2012 Notice of Allowance from U.S. Appl. No. 12/642,797.

U.S. Appl. No. 12/642,797 filed Dec. 19, 2009, entitled "System and Method for Providing Mobility Across Access Technologies in a Network Environment," Inventor(s): Kent Leung, et al.

USPTO Apr. 8, 2011 Final Office Action from U.S. Appl. No. 12/371,516.

USPTO Dec. 14, 2011 Non-Final Office Action from U.S. Appl. No. 12/371,524.

USPTO May 10, 2012 Non-Final Office Action from U.S. Appl. No. 12/371,516.

USPTO Oct. 7, 2011 Non-Final Office Action from U.S. Appl. No. 12/642,797.

USPTO Oct. 19, 2011 Response to Non-Final Office Action mailed Jul. 21, 2011 from U.S. Appl. No. 12/371,511.

USPTO Jul. 5, 2012 Final Office Action from U.S. Appl. No. 12/371,524.

USPTO Jul. 11, 2012 Response to May 20, 2012 Non-Final Office Action from U.S. Appl. No. 12/371,516.

USPTO Oct. 4, 2012 RCE Response to Jul. 5, 2012 Final Office Action from U.S. Appl. No. 12/371,524.

USPTO Nov. 2, 2012 Final Rejection from U.S. Appl. No. 12/371,516.

USPTO Sep. 12, 2013 Non-Final Office Action from U.S. Appl. No. 12/987,311.

USPTO Feb. 4, 2013 RCE Response to Nov. 2, 2012 Final Rejection from U.S. Appl. No. 12/371,516.

USPTO Aug. 1, 2013 Non-Final Rejection from U.S. Appl. No. 12/371,516.

USPTO Jan. 27, 2014 Final Rejection from U.S. Appl. No. 12/371,516.

USPTO Dec. 8, 2013 Notice of Allowance from U.S. Appl. No. 12/987,311.

USPTO Jan. 30, 2014 Non-Final Office Action from U.S. Appl. No. 12/371,524.

USPTO Aug. 15, 2014 Final Office Action from U.S. Appl. No. 12/371,524.

USPTO May 22, 2014 Non-Final Office Action from U.S. Appl. No. 12/371,516.

USPTO Jun. 25, 2014 Non-Final Office Action from U.S. Appl. No. 12/371,511.

USPTO Dec. 3, 2014 Non-Final Office Action from U.S. Appl. No. 12/371,524.

USPTO Dec. 15, 2014 Final Office Action from U.S. Appl. No. 12/371,516.

USPTO Nov. 12, 2014 Notice of Allowancae from U.S. Appl. No. 12/371,511.

* cited by examiner

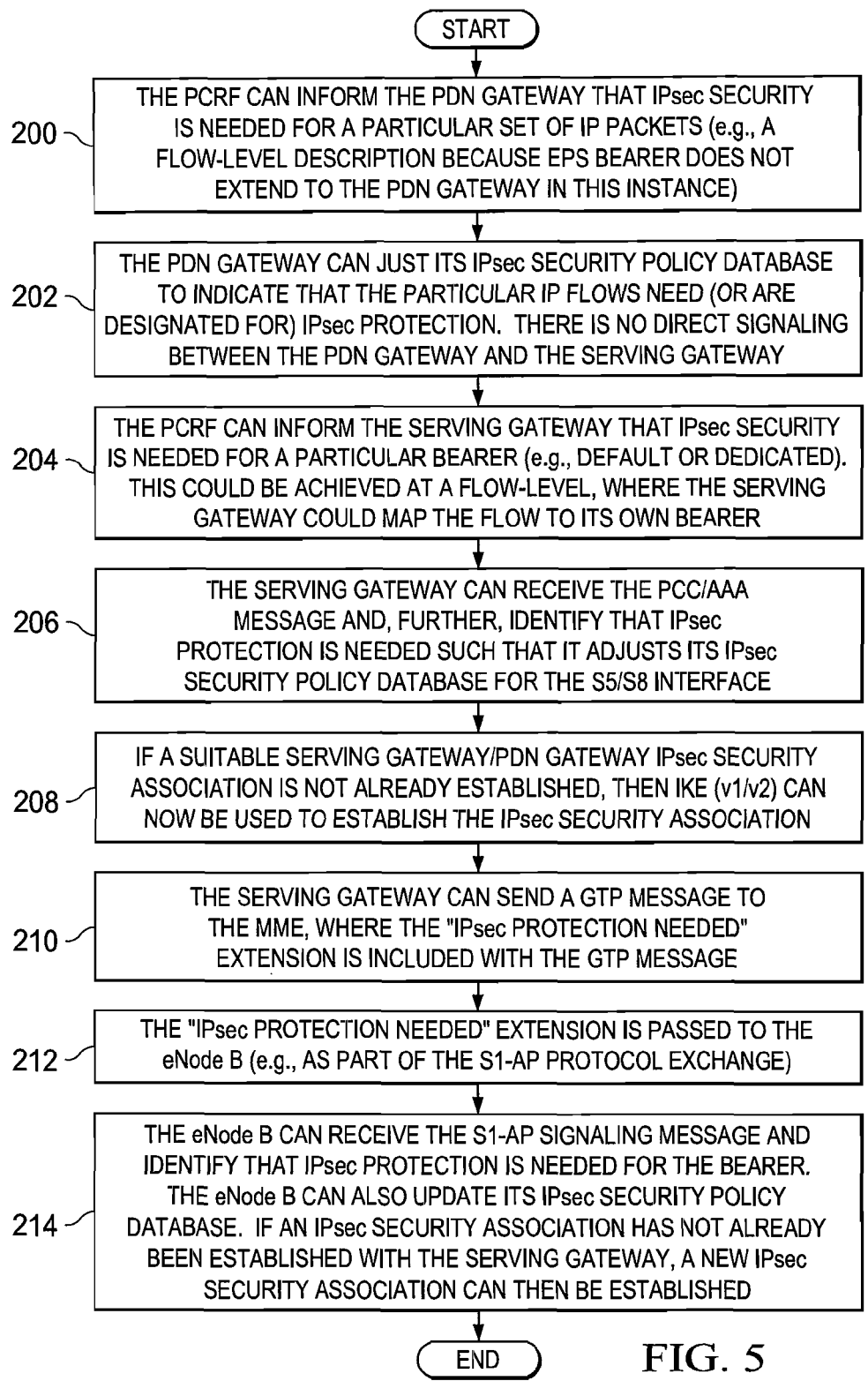

SYSTEM AND METHOD FOR PROVIDING SELECTIVE BEARER SECURITY IN A NETWORK ENVIRONMENT

TECHNICAL FIELD

This disclosure relates in general to the field of communications and, more particularly, to providing selective bearer security in a network environment.

BACKGROUND

Networking architectures have grown increasingly complex in communications environments. In addition, the augmentation of clients or end users wishing to communicate in a network environment has caused many networking configurations and systems to respond by adding elements to accommodate the increase in networking traffic. As the subscriber base of end users increases, proper routing and efficient management of communication sessions and data flows become even more critical. Long Term Evolution (LTE) represents the last step toward the 4th generation (4G) of radio technologies designed to increase the capacity and the speed of mobile networks. The 3rd Generation Partnership Project (3GPP) Evolved Packet System (EPS) (e.g., 3GPP TS 23.401 and 23.402) defines several elements that process user plane traffic. Certain types of security processing can be resource intensive and expensive. Hence, there is a significant challenge in coordinating which flows merit particular processing in order to minimize resources and expenses associated with optimally managing network traffic.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 4-5 are simplified flow diagrams representing various example activities, which may be applicable to certain communication scenarios involving the communication system.

DETAILED DESCRIPTION OF EXAMPLE EMBODIMENTS

Overview

An example method is provided and includes receiving a message related to a bearer or an Internet Protocol (IP) flow, the message includes an extension indicating whether an Internet Protocol security (IPsec) feature is designated for the bearer or the IP flow. The method further includes mapping a communication flow to the bearer or the IP flow, and applying the IPsec feature to the bearer or the IP flow. In other embodiments, the method can include communicating the extension to a next destination, and updating a security policy to indicate that the bearer or the IP flow is designated for the IPsec feature. In yet other embodiments, an Internet Key Exchange (IKE) is used to establish a security association for a serving gateway associated with the communication flow. The extension is provided at an IP flow level or at a bearer level such that network traffic associated with the communication flow is designated for the IPsec feature.

The extension can be provided at a user level such that network traffic associated with a particular user is designated for the IPsec feature. Additionally, the extension can be provided at an access point name (APN) level such that network traffic associated with a particular APN is designated for the IPsec feature. Also, the extension can be communicated in conjunction with communicating a quality of service (QoS) characteristic, a charging characteristic, or a deep packet inspection (DPI) characteristic for the communication flow. In one instance, the extension is associated with a voice over IP (VoIP) call that is designated for the IPsec feature.

Example Embodiments

Figure 1:
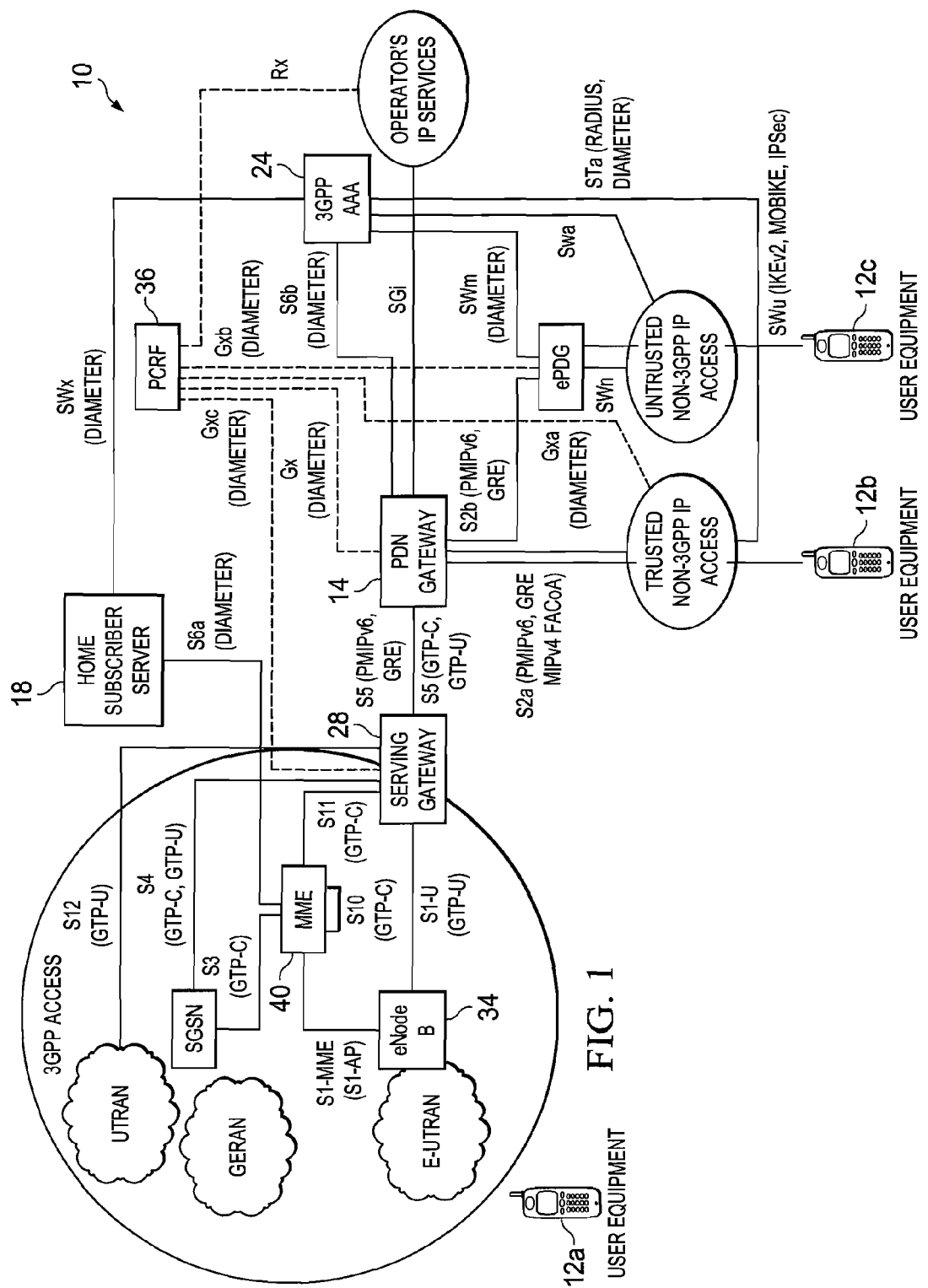
FIG. 1 is a simplified block diagram of a communication system for providing selective bearer security in a network environment in accordance with one embodiment of the present disclosure.

Turning to FIG. 1, FIG. 1 is a simplified block diagram of a communication system 10 for providing selective bearer security in a network environment. This particular configuration may be tied to the 3rd Generation Partnership Project (3GPP) Evolved Packet System architecture, but alternatively this depicted architecture may be applicable to other environments equally. The example architecture of FIG. 1 includes multiple end users operating user equipment (UE) 12*a-c* and a packet data network (PDN) gateway 14, which has a logical connection to a serving gateway 28. Also provided is a home subscriber server (HSS) 18 and an Authentication, Authorization, and Accounting (AAA) element 24. Serving gateway 28 has a logical connection to an eNodeB 34 and a Mobility Management Entity (MME) 40. Both serving gateway 28 and PDN gateway 14 can interface with a Policy and Charging Rules Function (PCRF) 36.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Also provided in the architecture of FIG. 1 is a series of interfaces, which can offer mobility, policy control, AAA functions, and charging activities for various network elements. For example, interfaces can be used to exchange point of attachment, location, and access data for one or more end users. Resource, accounting, location, access network information, network address translation (NAT) control, etc. can be exchanged using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

There are two access cases represented in FIG. 1, which depicts these as trusted and untrusted non-3GPP IP access. For the trusted scenario, a viable relationship exists between the service provider and the core network. For the untrusted scenario, a suitable security mechanism can be provided to ensure the integrity of the data communications (e.g., encryption and decryption operations can occur in this scenario and, further, involve an evolved packet data gateway (ePDG), which has a logical connection to PCRF 36 as shown in FIG. 1).

In more general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the ePDG, which provides for IPsec security associations to the user equipment over the untrusted IP access network. The ePDG (in turn) supports mobility, policy, and AAA interfaces to the EPC, similar to the trusted IP access networks.

Before detailing the operations and the infrastructure of FIG. 1, certain contextual information is provided to offer an overview of the problems encountered in Internet Protocol security (IPsec) provisioning. Such information is offered earnestly and for teaching purposes only and, therefore, should not be construed in any way to limit the broad applications for the present disclosure. In network environments, security protocols are critical; however, such protocols can be resource intensive and costly. IPsec is a protocol suite for securing Internet Protocol (IP) communications by integrity protection and/or encrypting each IP packet of a data stream. IPsec also includes protocols for establishing mutual authentication between agents at the beginning of the session and for negotiating cryptographic keys to be used during the session. IPsec can be used to protect data flows between a pair of hosts (e.g., computer users or servers), between a pair of security gateways (e.g., routers or firewalls), or between a security gateway and a host.

The 3GPP EPS (e.g., 3GPP TS 23.401 and 23.402) defines several elements that process user plane traffic. For the E-UTRAN long-term evolution (LTE) access network, those elements are typically the eNodeB, the serving gateway (S-GW), and the PDN gateway (P-GW). For non-3GPP IP access networks, these elements commonly include the ePDG or the trusted non-3GPP IP Access Network (e.g., a high rate packet data (HRPD) Serving Gateway (HSGW), or an eHRPD).

3GPP TS 33.210 defines a security architecture for network domain IP based control planes (i.e., network domain security (NDS)/IP network layer security). NDS/IP security applies to control plane traffic only (e.g., a GPRS tunneling protocol (GTP)-C). While NDS/IP has a broad 3GPP scope, 3GPP TS 33.401 defines the specific security architecture for the 3GPP System Architecture Evolution (SAE), or the EPC. 33.401 is based on NDS/IP and, further, extends the control plane security requirements to cover user plane traffic. TS 33.401 can apply to 23.401-based EPS architectures, where TS 33.402 is similar in nature and covers 23.402 based EPS architectures.

Only certain types of traffic qualify for IPsec protection, but IPsec processing is expensive. Certain traffic, which is mapped to EPS bearers in the EPC, does not require IPsec protection and, therefore, usage of IPsec should be more discretionary. The issue relates to how to apply IPsec protection on a granular level. The IPsec protocol has a security database, which defines the packets that should receive IPsec protection. In order to decide the protection to be provided for an outgoing packet, IPsec uses a set of selectors (e.g., source and destination IP addresses) to consult the Security Policy Database (SPD), which provides instructions for the packet handling. If security is to be applied, a Security Association (SA) is used (established first, if needed), and a Security Parameter Index (SPI) identifying the SA is added to the packet. The SPI is an index to the security association database (SADB), and using this along with the destination IP address in a packet header, these elements uniquely identify a security association for that packet. A similar procedure is performed for an incoming packet, where IPsec consults the SPD to determine whether security is to be applied and, if so, gathers decryption and verification keys from the security association database based on the SPD and SPI. Selector characteristics to be evaluated can include source and destination ports, source and destination IP addresses, transport protocols, etc.

Note that NDS/IP is based on the use of IPsec for protection of a particular set of interfaces and, hence, the 3GPP EPS security architecture for IP-based interfaces relies on IPsec (e.g., Internet Key Exchange (IKEv1/IKEv2) and IPsec Encapsulating Security Payload (ESP)). IPsec processing has a significant computational overhead. Because high data rates are offered by LTE (and other access technologies supported by the EPC), IPsec protection of user plane traffic results in increased processing requirements and, hence, overall cost. In a general sense, IPsec protection of all user plane traffic is simply not economical. A more pragmatic or dynamically selective approach to IPsec protection of user plane traffic would be prudent.

Example embodiments of the present disclosure provide a technique that addresses these issues (and others) in providing a selective IPsec protocol. In one particular instance, IPsec protection can be applied selectively to user plane traffic (e.g., between eNodeB 34 and serving gateway 28, between serving gateway 28 and PDN gateway 14, etc.). The same protocol could readily be used for non-3GPP access networks. Communication system 10 can use policy control and charging (PCC) infrastructure to inform elements about EPS bearers and/or flows (e.g., IP flows identified by source and destination IP-address/port and transport protocol) that are designated for the IPsec protection feature. Those indications can leverage existing control plane signaling messages between the network elements to dynamically adjust the IPsec security policy databases (SPDs) on each side accordingly.

The security policy database can be intelligently extended to be EPS bearer aware to determine which bearers merit IPsec protection. PCRF 36 can communicate this information to PDN gateway 14 (e.g., via appropriate signaling extensions). Hence, in addition to quality of service (QoS) settings, security settings are also being delivered to PDN gateway 14. The security settings and/or signaling (that identifies particular bearers for IPsec protection) can be achieved using a flag, a field, an extension, an attribute, or any other suitable object. As used herein in this Specification, the term 'extension' is meant to encompass any of these possibilities for signaling particular bearers are being designated for the IPsec protection feature.

In one example based on the 23.401 architecture, a protocol can extend messaging associated with policy signaling that is already occurring in the network, and which involves PDN gateway 14. The protocol can also extend signaling (GTP in the case of 23.401) from PDN gateway 14 to serving gateway 28. Serving gateway 28 can then communicate with MME 40, which can interact with eNodeB 34 such that these components are informed of particular bearers that merit IPsec protection. In this general sense, these three elements (PDN gateway 14, serving gateway 28, and eNodeB 34) are now made aware of which bearers require IPsec protection. This could involve GTP signaling, S1-U signaling, or any other appropriate signaling that may occur in communication system 10.

Note that the architecture of communication system 10 is capitalizing on the notion that not all traffic requires IPsec protection. Most consumer Internet service provider (ISP) service, for example, does not require this level of protection, since the user datagrams (e.g., IP packets) are not further manipulated or may simply be forwarded to an insecure network such as the Internet, once passing beyond PDN gateway 14. Conversely, enterprise virtual private network (VPN)-based services may require IPsec protection. Similarly, certain service provider applications may require IPsec protection of user plane traffic being backhauled. A voice over IP (VoIP) bearer may, for example, require IPsec protection on the backhaul link, as opposed to web-browsing (which may itself have end-to-end security rather than the hop-by-hop security afforded by NDS/IP).

In one particular implementation, Policy and Charging Control (PCC) infrastructure can be extended with indications as to whether traffic needs to be afforded IPsec protection. The PCC element may be provided within PCRF 36 in one particular example implementation, or simply interact with PCRF 36. Note that the PCC can be applied dynamically (using PCRF 36) or statically (using local provisioning). Any type of policy control and charging element (e.g., AAA element) can be employed to signal these IPsec designations. In addition, communication system 10 can extend signaling for user plane and control plane network elements to indicate whether bearer traffic needs to be IPsec protected. Additionally, communication system 10 can dynamically update the IPsec SPD on the user plane network elements, which are tasked with processing traffic between an access network (e.g., radio access network—RAN) and PDN gateway 14 to reflect instructions from the PCC infrastructure.

It should also be noted that the PCC extensions for indicating IPsec protection can be applied at multiple levels (e.g., at a user level indicating IPsec protection for a particular user, at an access point name (APN)-level indicating that IPsec protection should be applied for all traffic associated with a particular APN, at a flow-level indicating that all traffic for the flow (e.g. 5-tuple) should be IPsec protected. Note that such flows are not limited to 5-tuples, but can extend to, for example, deep packet inspection (DPI) detected flows and associated applications.

One commonality in each of these potential scenarios is that each result in one or more EPS bearers being established when used in an Evolved Packet System, other systems may employ similar mechanisms (e.g., PDP contexts). The second aspect of communication system 10 relates to dynamically adjusting the IPsec SPD to indicate whether IPsec processing is needed for a particular EPS bearer. This applies to default bearers and dedicated bearers. Note that in a 23.401-based system, the PCC extensions could apply to PDN gateway 14 only, whereas in a 23.402 based system (where the EPS bearer terminates at serving gateway 28), the PCC extensions could apply to serving gateway 28 as well. Additionally, the 23.402 serving gateway can be configured to adjust the IPsec SPD at the flow-level, instead of the EPS bearer level.

The PCC extensions by themselves can adjust the IPsec SPD on the gateway, which is receiving the policy signaling (i.e., the PDN gateway and 23.402 serving gateway). However, the IPsec SPD (on both the sending and receiving side) should be synchronized. In order to achieve the synchronization, communication system 10 can extend the GTP-based S5/S8 interface between the 23.401 serving gateway and the 23.401 PDN gateway with indications as to whether IPsec is to be applied to a particular EPS bearer (e.g., when the bearer is created), other systems may use different protocols (e.g., Proxy Mobile IP). Similarly, the SPDs of the eNodeB and the serving gateway should be in synchronization. The signaling path between eNodeB 34 and serving gateway 28 traverses MME 40 and, hence, similar enhancements can be provided on the S11 interface between serving gateway 28 and MME 40 (and similarly for the S1-MME interface between MME 40 and eNodeB 34), other interfaces may be enhanced as well (e.g., S4 with or without using a Direct Tunnel architecture). Once an IPsec protected bearer is deleted, the IPsec SPD entry for that bearer can be removed.

In terms of advantages in employing certain features of communication system 10, only a subset of the network traffic is designated for the IPsec feature, which is resource intensive. This would avoid costly processing and/or limitations of the throughput of network traffic. In addition, the functions of communication system 10 apply IPsec protection discretionarily for EPS bearers that actually need it. Such operations also allow an operator to dynamically (or statically) decide (and indicate) which traffic (that in turn can be mapped to different EPS bearers) needs IPsec protection. Moreover, such operations allow selective IPsec protection to be linked with a user's identity (profile), an APN being used, specific applications, etc. Also, these operations allow a single network element to support users, APNs, and flows with differing security requirements (e.g. as opposed to dedicated APNs as being IPsec protected or not).

In operation, UE 12a can attach to the network for purposes of establishing a communication session. UE 12a can communicate with eNodeB 34, which can further interact with MME 40 to complete some form of authentication for this particular user. MME 40 can interact with serving gateway 28, which interacts with PDN gateway 14 such that a session is being set up between these components. Tunnels would be established at this juncture, and a suitable IP address would also be issued for this particular user. This process generally involves a default EPS bearer being created for UE 12a.

As the session is established, PDN gateway 14 can interact with PCRF 36 to identify policies associated with this particular user. PCRF 36 may designate a certain QoS setting and, further, in using the features outlined herein, PCRF 36 can communicate to PDN gateway 14 that this particular user does not need IPsec protection for his default bearer traffic. In one example, an extension is issued to PDN gateway 14 (from PCRF 36) to identify this security condition.

PDN gateway 14 receives this information and updates its associated security policy database such that (for this particular EPS bearer that was just established) IPsec protection will not be provided. Additionally, PDN gateway 14 relays this information to serving gateway 28 using the same extension (i.e., on a different interface, likely using a different protocol). Serving gateway 28 now knows that IPsec protection will not be provided for this recently established EPS bearer. Information from serving gateway 28 is communicated to MME 40, which relays the security extension to eNodeB 34. Now, each of these components has been informed that for this recently established EPS bearer, IPsec protection is not to be applied. Note that UE 12a is indifferent to this signaling because it simply receives the IP address it requested. The session has been established and the components involved in the session are aware that IPsec is not warranted in this instance.

Taking the example a step further, if the user seeks to place a voice over IP (VoIP) call, then the flow could be as follows. Through various signaling with associated service provider infrastructure, PCRF 36 could be contacted for establishing a dedicated bearer (e.g., flow of packets with specific characteristics such as QoS and/or security) for this VoIP traffic. Hence, new settings and QoS should be designated for this flow of packets. A message can be sent from PCRF 36 to PDN gateway 14 to establish the EPS bearer for the flow of packets, and to apply IPsec. The security extension would be included in this particular message. Subsequently, signaling would occur as previously discussed, where each of the associated components (e.g., PDN gateway 14, serving gateway 28, eNodeB 34, MME 40) can become aware that IPsec should be applied for this particular bearer. At this point, there are two EPS bearers: one having a security setting for applying IPsec and one having no IPsec protection. As packets flow through the system, the infrastructure of communications system 10 understands which packets belong to which EPS bearer such that IPsec protection is intelligently applied.

Figure 2:
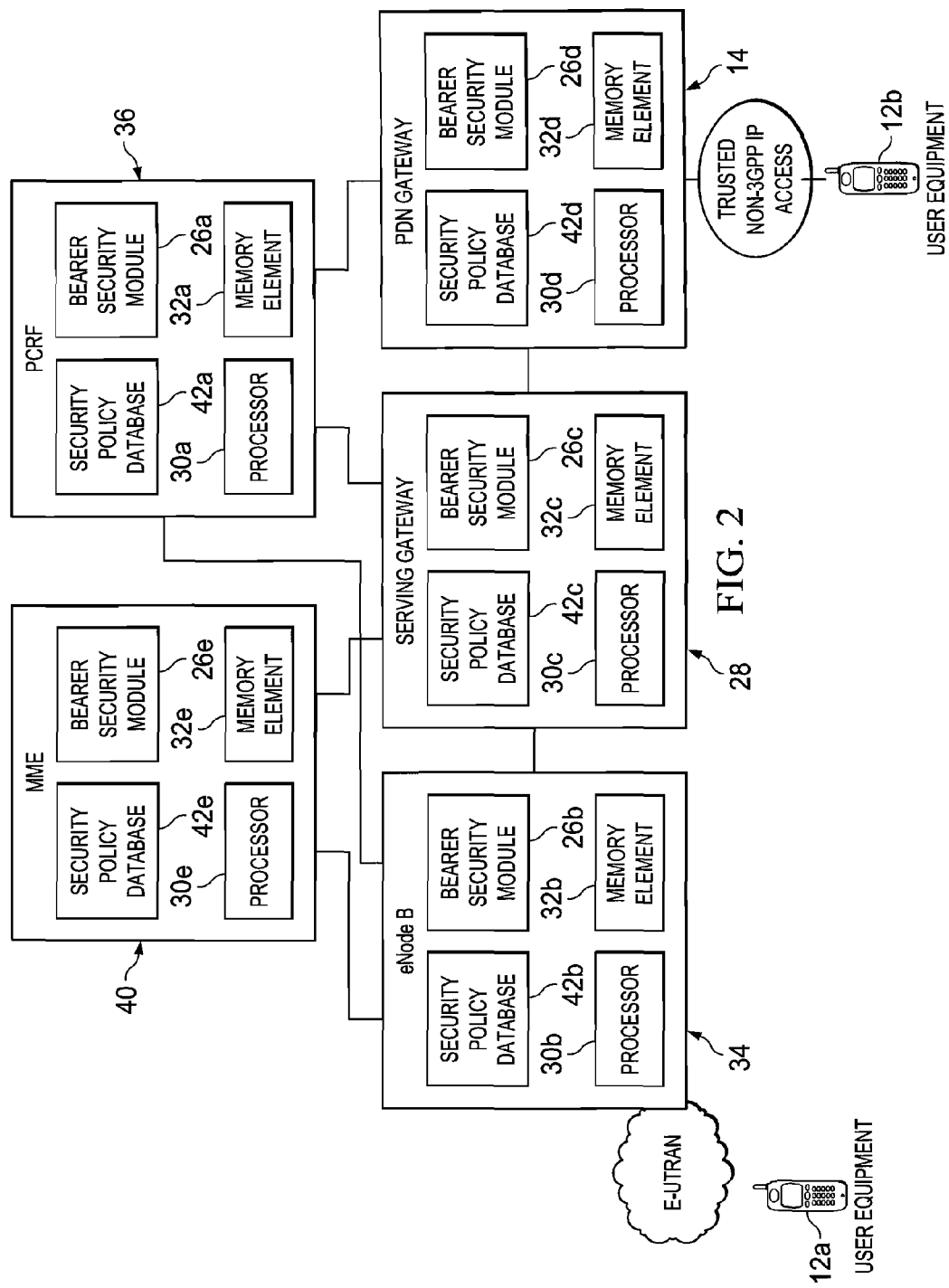
FIG. 2 is a simplified block diagram of additional details associated with the communication system for providing selective bearer security.

Turning to FIG. 2, FIG. 2 is a simplified block diagram illustrating additional details associated with one potential embodiment of communication system 10. FIG. 2 includes PDN gateway 14, serving gateway 28, eNodeB 34, PCRF 36, and MME 40. Each of these elements includes a respective bearer security module 26*a-e*, a respective processor 30*a-e*, a respective memory element 32*a-e*, and a respective security policy database 42*a-e*. Note that in certain examples, security policy databases can be consolidated with memory elements (or vice versa), or the storage can overlap/exist in any other suitable manner. Also depicted in FIG. 2 is UE 12*a-b*, where these devices can attach to respective networks in order to conduct their communication sessions.

UE 12*a-b* can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone, an IP phone, or any other device, component, element, or object capable of initiating voice, audio, video, media, or data exchanges within communication system 10. UE 12*a-b* may also be inclusive of a suitable interface to the human user, such as a microphone, a display, a keyboard, or other terminal equipment. UE 12*a-b* may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12*a-b* have a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

PCRF 36 is a network element responsible for coordinating charging and/or policy decisions for UE 12*a-b*. PCRF 36 can be configured to use subscription information as a basis for the policy and charging control decisions. The subscription information may apply for both session-based and non-session based services. PCRF 36 can maintain session linking to the sessions via policy interactions with the PDN gateway 14 (and possibly serving gateway 28) and application functions (e.g., provided as part of the operator's IP services). An application function (AF) can be provided within PCRF 36 (or simply interact with PCRF 36) in order to offer applications that require dynamic policy and/or charging control. The AF can communicate with PCRF 36 to transfer dynamic session information. Additionally, any type of policy and/or charging control element (e.g., PCC infrastructure) can be provided within (or suitably interact with) PCRF 36.

HSS 18 offers a subscriber database in 3GPP (e.g., GSM, LTE, etc.) environments. In one sense, HSS 18 can provide functions similar to those offered by an AAA server in a CDMA environment. When a user moves to 3GPP access, HSS 18 can be aware of his location and his anchor point (i.e., PDN gateway 14). Additionally, HSS 18 can communicate with AAA element 24 such that when the user moves to a CDMA environment, he still has an effective anchor for his communications (i.e., PDN gateway 14). HSS 18 and AAA element 24 can coordinate this state information for the user (and synchronize this information) to achieve his mobility. No matter how the user moves, the access network element can be interacting with either HSS 18 or AAA element 24 in order to identify which PDN gateway should receive the appropriate signaling. The route to UE 12*a-b* can be consistently maintained, where routing topology ensures that data is sent to the correct IP address. Thus, synchronization activity on the backend of the architecture allows mobility to be achieved for the user when operating in different environments. Additionally, in certain examples, PDN gateway 14 performs home agent functions, and the trusted non-3GPP IP access network can provide packet data serving node (PDSN) functions in order to achieve these objectives.

AAA element 24 is a network element responsible for accounting, authorization, and authentication functions for UE 12*a-b*. For the AAA considerations, AAA element 24 may provide the mobile node IP address and the accounting session identification (Acct-Session-ID) and other mobile node states in appropriate messaging (e.g., via an access-Request/access-Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

In one example implementation, PDN gateway 14, serving gateway 28, eNodeB 34, and/or MME 40 are network elements that facilitate or otherwise help coordinate selective bearer security protocols (e.g., for networks such as those illustrated in FIG. 1). As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, PDN gateway 14, serving gateway 28, eNodeB 34, and/or MME 40 include software (e.g., as part of bearer security modules 26a-e, etc.) to achieve, or to foster, the selective bearer security operations, as outlined herein in this Specification. In other embodiments, this feature may be provided externally to these elements, or included in some other network device to achieve this intended functionality. Alternatively, these elements include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the selective bearer security functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In regards to the internal structure associated with communication system 10, each of PDN gateway 14, serving gateway 28, eNodeB 34, and/or MME 40 can include memory elements for storing information to be used in achieving the selective bearer security operations, as outlined herein. Additionally, each of these devices may include a processor that can execute software or an algorithm to perform the selective bearer security activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' The information being tracked or sent by PDN gateway 14, serving gateway 28, eNodeB 34, and/or MME 40 could be provided in any database, register, control list, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and user equipment (e.g., mobile nodes) can also include suitable interfaces for receiving, transmitting, and/or otherwise communicating data or information in a network environment.

Figure 3:
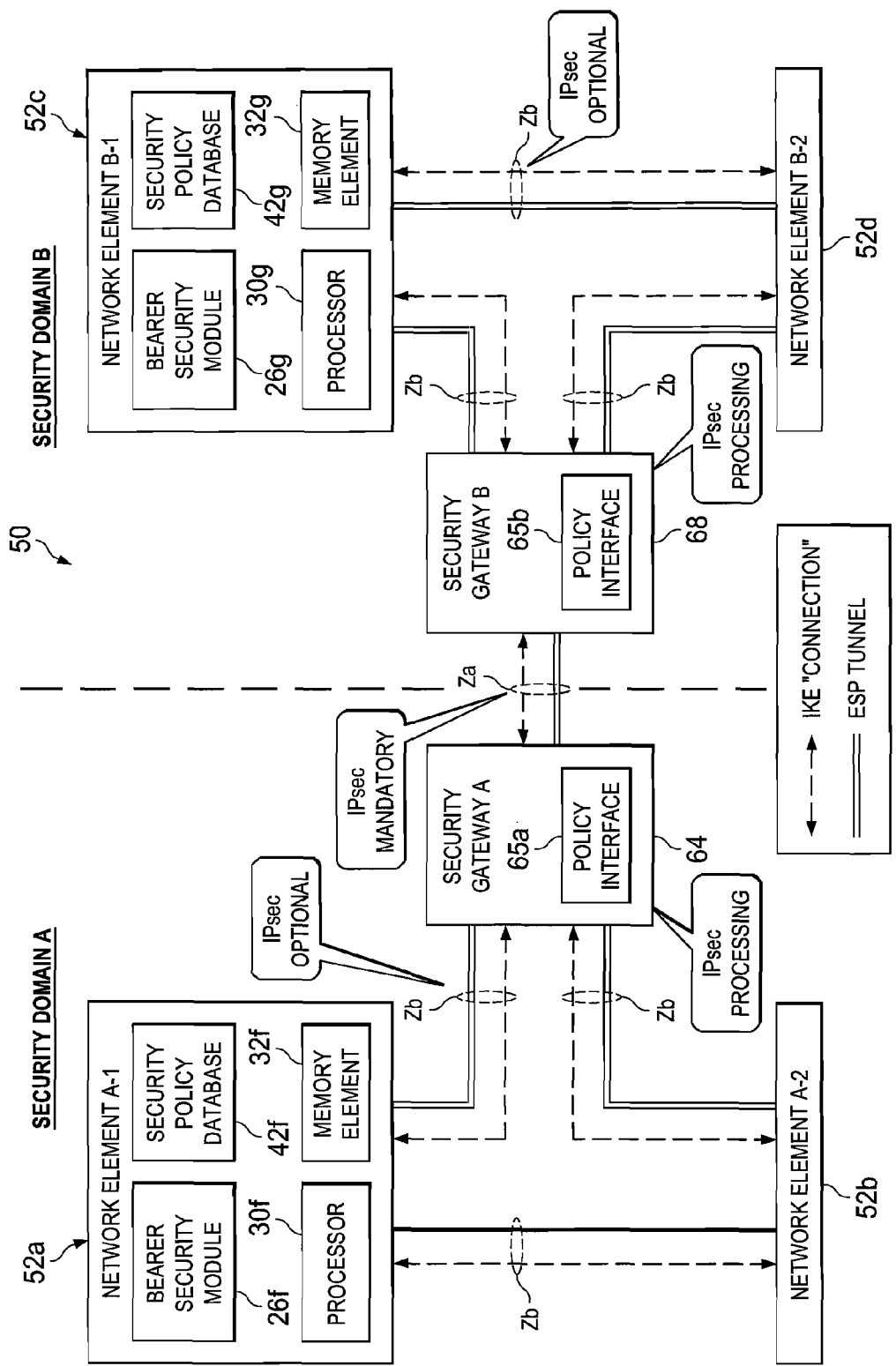
FIG. 3 is a simplified block diagram of another example of a communication system for providing selective bearer security in a network environment in accordance with one embodiment of the present disclosure.

FIG. 3 is a simplified block diagram illustrating one example system 50 associated with a selective bearer security protocol. In this particular arrangement, a series of network elements 52a-d can be used to inform a set of security gateways 64 and 68 of bearers that require IPsec. In addition, there are two security domains (Security Domain A and Security Domain B) present, where IPsec is considered mandatory on the connection between security gateway A 64 and security gateway B 68. Also depicted in FIG. 3 are a number of ESP tunnels and a number of IKE connections. In addition, network element A-1 and network element B-1 (in this particular configuration) are equipped to intelligently coordinate selective bearer security protocols, as outlined herein. Each of these elements may include a respective bearer security module 26f-g, a respective processor 30f-g, a respective security policy database 42f-g, and a respective memory element 32f-g.

In general terms, the basic scenario of FIG. 3 involves the Za interface, where the security gateway (SEG) is the element that does the IPsec processing. The mechanism outlined herein (which relies on signaling extensions) can operate when the SEGs do not see the signaling. Two ways of solving this issue are described below, and it should be understood that the SEG can perform the actual IPsec processing. Additionally, one of the alternatives can include a policy [signaling] interface 65a-b for each security gateway, as shown in FIG. 3.

Note that thus far, discussions have considered a solution for when the eNodeB/serving gateway/PDN gateway, or other relevant network elements for non-3GPP access networks (e.g., PDSN, ASN GW, CMTS, or BNG), is providing the IPsec protection. However, NDS/IP also defines a SEG function. The security gateway can be used between security domains (as shown in FIG. 3). Furthermore, a given security gateway may be provided separately from the eNodeB/serving gateway/PDN gateway, or other relevant network elements. Such a standalone SEG typically does not see the signaling messages, which could be employed to achieve the selective bearer security protocol outlined herein. This issue can be addressed in several ways such that a selective bearer security mechanism can be applied to this architecture.

In this particular arrangement, a policy interface is provided on each security gateway 64 and 68, where a given PCRF is configured to signal these interfaces directly. Alternatively, a signaling interface is provided on each security gateway 64 and 68, where the eNodeB, or the serving gateway, or the PDN gateway relays IPsec SPD changes to the SEGs using the signaling interface (e.g., using either an existing or a new protocol with relevant security extensions). Note that user plane network elements should know which SEGs are being used for a particular EPS bearer. A Control Point Discovery (with a new "SEG discovery" application) can be used to identify the SEGs.

In a particular example implementation, there is already a bearer context associated with each bearer. Bearer security modules 26a-f could be configured to simply set a flag for each of these bearers (indicating whether they require IPsec protection). Packets to be sent can then be routed along the IPsec processing path, and when packets are received for such a bearer, they are handled if they were received successfully via the IPsec processing path. Note that while there may be many (e.g., millions) of SPD entries, there is not necessarily a corresponding number of IPsec security associations (SAs) that have to be managed because (commonly) there is one IPsec security association per node-pair (assuming the same security policy, etc.). There can be per-bearer entries in the nodes involved in the network. Communication system 10 can provide the operator with the ability to make a decision to specify policies on a per-bearer basis. Different service tiers (having different security guarantees) can also readily be offered. Such operations can be performed on a per-user basis, a per-APN basis, etc.

Figure 4:
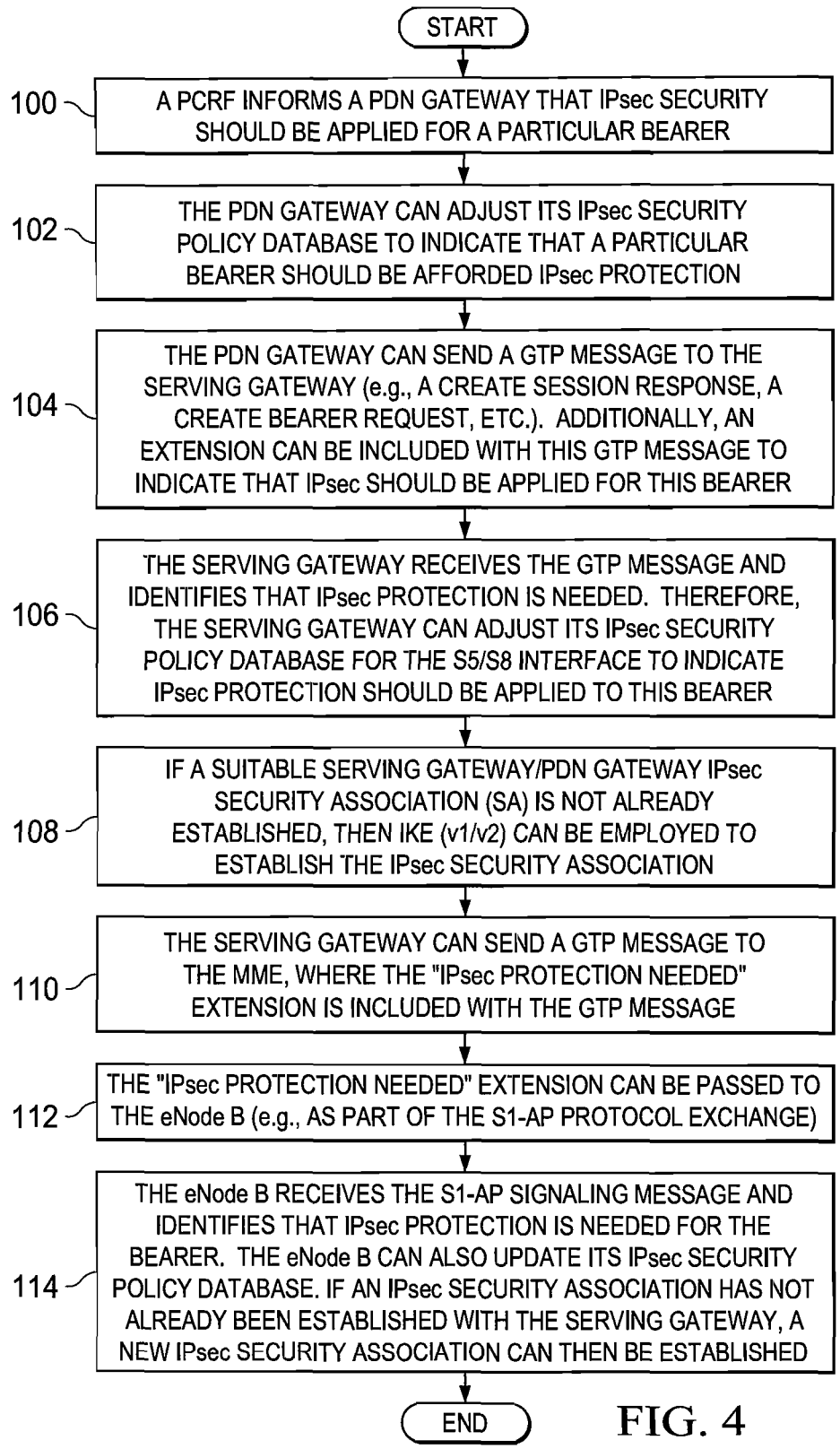

FIG. 4 is a simplified flowchart illustrating one example flow associated with the present disclosure. This particular flow may be associated with the 3GPP TS 23.401 architecture. The flow begins at step 100, where a given PCRF (or an AAA server) informs a PDN gateway that IPsec security should be applied for a particular bearer (e.g., default or dedicated). This could be done at a flow-level, where the PDN gateway can map the flow to its own bearer. At step 102, the PDN gateway can adjust (i.e., update) its IPsec security policy database to indicate that a particular bearer should be afforded IPsec protection.

At step 104, the PDN gateway can send a GTP message to the serving gateway (e.g., a create session response, a create bearer request, etc.). Additionally, an extension can be included with this GTP message to indicate that IPsec should be applied for this bearer. At step 106, the serving gateway receives the GTP message and identifies that IPsec protection is needed. Therefore, the serving gateway can adjust its IPsec security policy database for the S5/S8 interface to indicate IPsec protection should be applied to this bearer (and similarly for the RAN facing interface, e.g., S1-U to the eNodeB). At step 108, if a suitable serving gateway/PDN gateway IPsec security association is not already established, then IKE(v1/v2) can be employed to establish the IPsec security association. At step 110, the serving gateway can send a GTP message to the MME, where the "IPsec protection needed" extension is included with the GTP message.

At step 112, the "IPsec protection needed" extension can be passed to the eNodeB (e.g., as part of the S1-AP protocol exchange). Again, this could be provided as a flag, a field, an attribute, or any other object capable of signaling this condition. At step 114, the eNodeB receives the S1-AP signaling message and identifies that IPsec protection is needed for the bearer (S1-U interface to the S-GW). The eNodeB can also update its IPsec security policy database. If an IPsec security association has not already been established with the serving gateway, a new IPsec security association can then be established. Note that once this particular bearer is deleted, the security policy databases on the eNodeB, serving gateway, and PDN gateway can be updated accordingly. It is optional whether the IPsec security association may or may not be deleted at this point.

FIG. 5 is a simplified flowchart illustrating one example flow associated with the present disclosure. This particular flow may be associated with the 3GPP TS 23.402 architecture. The flow begins at step 200, where the PCRF (or AAA server) can inform the PDN gateway that IPsec security is needed for a particular set of IP packets (e.g., at a flow-level because the EPS bearer does not extend to the PDN gateway in this instance). At step 202, the PDN gateway can update its IPsec security policy database to indicate that the particular IP flows need (or are designated for) the IPsec protection feature. Note there is no direct signaling between the PDN gateway and the serving gateway in this particular instance.

At step 204, the PCRF (or AAA server) can inform the serving gateway that IPsec protection is needed for a particular flow of packets or bearer (e.g., default or dedicated). This could be achieved at a flow-level, where the serving gateway could map the flow to its own bearer. At step 206, the serving gateway can receive the policy control and charging (s)/AAA message and, further, identify that IPsec protection is needed such that it adjusts its IPsec policy database for the S5/S8 interface (i.e., indicating IPsec protection is needed for the set of IP packets that map to this bearer). A similar operation can apply to the SPD for bearer on the S1-U interface. At step 208, if a suitable serving gateway/PDN gateway IPsec security association is not already established, then IKE(v1/v2) can now be used to establish the IPsec security association. At step 210, the serving gateway can send a GTP message to the MME, where the "IPsec protection needed" extension is included with the GTP message.

At step 212, the "IPsec protection needed" extension is passed to the eNodeB (e.g., as part of the S1-AP protocol exchange). At step 214, the eNodeB receives the S1-AP signaling message and identifies that IPsec protection is needed for the bearer. The eNodeB can also update its IPsec security policy database. If an IPsec security association has not already been established with the serving gateway, a new IPsec security association can then be established. Note that once this particular bearer is deleted, the security policy databases on the eNodeB, serving gateway, and PDN gateway can be updated accordingly. It is optional whether the IPsec security association may or may not be deleted at this point.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding FIGURES are associated with only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and broadcast protocols, communication system 10 may be applicable to other exchanges, routing protocols, or routed protocols in which packets (not necessarily the routing protocol/packets described) are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

In a separate endeavor, communication system 10 may generally be configured or arranged to represent a 3G architecture applicable to universal mobile telecommunications system (UMTS), Long Term Evolution (LTE), and/or code division multiple access (CDMA) environments in accordance with a particular embodiment. However, these architectures are offered for purposes of example only and may alternatively be substituted with any suitable networking system or arrangement that provides a communicative platform for communication system 10. In other examples, FIG. 1 could readily include a serving general packet radio service (GPRS) support node (SGSN) using a Gn/Gp interface (instead of S3/S4), a gateway GPRS support node (GGSN), any type of network access server (NAS), etc. and all of these elements could interface with an authentication, authorization, and accounting (AAA) server. Moreover, the present disclosure is equally applicable to other cellular, wireless and fixed technologies including CDMA, Wi-Fi, WiMax, Femto, DOCSIS, DSL, Ethernet, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    receiving a message related to a bearer or an Internet Protocol (IP) flow, wherein the message includes selectors indicating whether an Internet Protocol security (IPsec) feature is designated for the bearer or the IP flow, and wherein the selectors can facilitate adjusting IPsec security policy databases in network elements using, at least in part, control plane signaling messages between the network elements and a packet data network gateway, wherein the IPsec security policy databases are adjusted at the flow level and not the encapsulating security payload bearer level, wherein policy control and charging extensions adjust the IPsec security policy databases on both a sending side and a receiving side such that the sending side and the receiving side are synchronized;
    mapping a communication flow to the bearer or the IP flow, wherein an Internet Key Exchange (IKE) is used to establish a security association for a serving gateway associated with the communication flow, and wherein the selectors are provided at a bearer level or at an IP flow level such that network traffic associated with the communication flow is designated for the IPsec feature, wherein signaling for user plane and control plane network elements are extended to indicate whether the bearer or the IP flow is designated for the IPsec feature; and
    applying the IPsec feature to the bearer or the IP flow.

2. The method of claim 1, further comprising:
    communicating the selectors to a next destination; and
    updating a security policy to indicate that the bearer or the IP flow is designated for the IPsec feature.

3. The method of claim 1, wherein the selectors are provided at a user level such that network traffic associated with a particular user is designated for the IPsec feature.

4. The method of claim 1, wherein the selectors are provided at an access point name (APN) level such that network traffic associated with a particular APN is designated for the IPsec feature.

5. The method of claim 1, wherein the selectors are communicated in conjunction with communicating a quality of service (QoS) characteristic, or a charging characteristic for the communication flow.

6. The method of claim 1, wherein the selectors are associated with a voice over IP (VoIP) call that is designated for the IPsec feature.

7. Logic encoded in one or more non-transitory tangible media that includes code for execution and when executed by a processor operable to perform operations comprising:
    receiving a message related to a bearer or an Internet Protocol (IP) flow, wherein the message includes selectors indicating whether an Internet Protocol security (IPsec) feature is designated for the bearer or the IP flow, and wherein the selectors can facilitate adjusting IPsec security policy databases in network elements using, at least in part, control plane signaling messages between the network elements and a packet data network gateway, wherein the IPsec security policy databases are adjusted at the flow level and not the encapsulating security payload bearer level, wherein policy control and charging extensions adjust the IPsec security policy databases on both a sending side and a receiving side such that the sending side and the receiving side are synchronized;
    mapping a communication flow to the bearer or the IP flow, wherein an Internet Key Exchange (IKE) is used to establish a security association for a serving gateway associated with the communication flow, and wherein the selectors are provided at a bearer level or at an IP flow level such that network traffic associated with the communication flow is designated for the IPsec feature, wherein signaling for user plane and control plane network elements are extended to indicate whether the bearer or the IP flow is designated for the IPsec feature; and
    applying the IPsec feature to the bearer or the IP flow.

8. The logic of claim 7, the operations further comprising:
    communicating the selectors to a next destination; and
    updating a security policy to indicate that the bearer or the IP flow is designated for the IPsec feature.

9. The logic of claim 7, wherein the inter-process communication is used to maintain the session for the subscriber when the subscriber is attached to different networks.

10. The logic of claim 7, wherein the selectors are provided at a user level such that network traffic associated with a particular user is designated for the IPsec feature.

11. The logic of claim 7, wherein the selectors are communicated in conjunction with communicating a quality of service (QoS) characteristic for the communication flow.

12. An apparatus, comprising:
    a memory element configured to store data;
    a processor operable to execute instructions associated with the data; and
    a bearer security module configured to interface with the processor in order to:
        receive a message related to a bearer or an Internet Protocol (IP) flow, wherein the message includes selectors indicating whether an Internet Protocol security (IPsec) feature is designated for the bearer or the IP flow, wherein the selectors can facilitate adjusting IPsec security policy databases in network elements using, at least in part, control plane signaling messages between the network elements and a packet data network gateway, wherein the IPsec security policy databases are adjusted at the flow level and not the encapsulating security payload bearer level, wherein policy control and charging extensions adjust the IPsec security policy databases on both the sending and receiving side such that the sending side and the receiving side are synchronized;

map a communication flow to the bearer or the IP flow, wherein an Internet Key Exchange (IKE) is used to establish a security association for a serving gateway associated with the communication flow, and wherein the selectors are provided at a bearer level or at an IP flow level such that network traffic associated with the communication flow is designated for the IPsec feature, wherein signaling for user plane and control plane network elements are extended to indicate whether the bearer or the IP flow is designated for the IPsec feature; and apply the IPsec feature to the bearer or the IP flow.

13. The apparatus of claim 12, further comprising:

a security policy database configured to store the bearer information associated with particular security settings, wherein a security policy stored in the security policy database can be updated to indicate that the bearer or the IP flow is designated for the IPsec feature.

14. The apparatus of claim 12, wherein the selectors are provided at a user level such that network traffic associated with a particular user is designated for the IPsec feature.

15. The apparatus of claim 12, wherein the selectors are provided at an access point name (APN) level such that network traffic associated with a particular APN is designated for the IPsec feature.

16. The apparatus of claim 12, wherein the selectors are communicated in conjunction with communicating a quality of service (QoS) characteristic, a charging characteristic, or a deep packet inspection (DPI) characteristic for the communication flow.

17. The apparatus of claim 12, wherein the selectors are associated with a voice over IP (VoIP) call that is designated for the IPsec feature.

18. The method of claim 1, wherein a security parameter index identifying a security association is added to the message if security is to be applied.

19. The method of claim 1, wherein the bearer or the IP flow originated from an electronic device and a second bearer or a second IP flow from the electronic device does not have the IPsec feature applied.

* * * * *